(No Model.)
J. D. MASON.
TYPE BAR BEARING.
No. 452,847. Patented May 26, 1891.
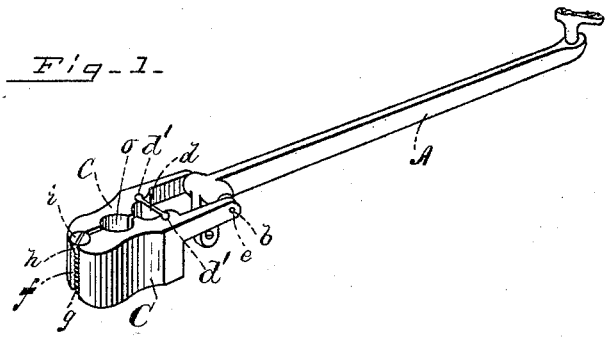
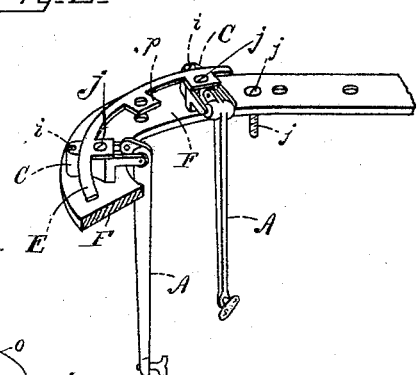
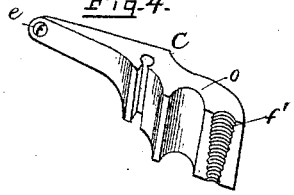
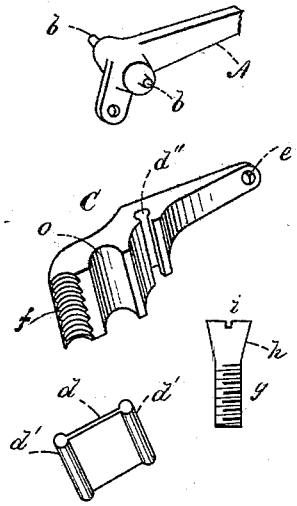

UNITED STATES PATENT OFFICE.

JEAN D. MASON, OF CLEVELAND, OHIO, ASSIGNOR, BY MESNE ASSIGNMENTS, TO THE AMERICAN WRITING MACHINE COMPANY, OF HARTFORD, CONNECTICUT.

TYPE-BAR BEARING.

SPECIFICATION forming part of Letters Patent No. 452,847, dated May 26, 1891.

Application filed December 29, 1888. Serial No. 294,946. (No model.)

*To all whom it may concern:*

Be it known that I, JEAN D. MASON, of Cleveland, in the county of Cuyahoga and State of Ohio, have invented a new and useful Improvement in Type-Writer Type-Bar Bearings, of which the following, taken in connection with the accompanying drawings, is a specification.

The object of my invention is to furnish an adjustable journal-bearing for the type-bar of a type-writing machine which can readily be tightened or loosened without removing or disarranging any of the mechanism; and it consists of the features of construction and combinations of devices hereinafter more fully described, and particularly pointed out in the appended claims.

In the accompanying drawings, Figure 1 illustrates a perspective view of my improved bearing. Fig. 2 shows the same attached to a part of a type-writing machine. Fig. 3 shows details enlarged, and Fig. 4 is a modification.

Similar letters represent like parts in all the figures.

A is the ordinary type-bar, and $b\ b$ are the conical journals of the same.

C C are two short and similar levers fulcrumed together by a transverse spring $d$, and at one end of each of the levers C is the conical socket $e$ for the journals of the type-bar, while at the other ends of both levers C are semicircular threaded grooves $ff$, which together make a circular threaded opening, which is vertical when the type-bar hanger is in place upon the machine. In this threaded opening a screw $g$ is adapted to engage, and the screw is partially conical or tapering, increasing in size (see $h$) until it gets to the head $i$.

Between the spring $d$ and grooves $ff$ a semicircular channel is made in each lever C of the hanger, which, when in their proper positions, will form substantially a circular opening $o$, through which the bolt $j$ passes to hold the hanger upon the machine. (See Fig. 2.) It will now readily be seen that when the screw $g$ is screwed down into the grooves $ff$, so that the taper $h$ will enter said grooves, any further downward turn of the screw will separate the adjacent ends of the levers C, and consequently bring their opposite ends, having the journal-sockets $ee$, closer together, and thus tighten the journal-bearings. When the taper $h$ of the screw $g$ is raised out of the grooves $ff$, the spring $d$ will bring the ends of the levers C having the grooves $ff$ closer together, and thus separate the journal-sockets $e\ e$. The screw $g$ may be tapering from its point to its head, or the grooves $f'\ f'$ may be tapering instead of the screw. (See Fig. 4.) The action will be the same in either case and as above—viz., to wedge the adjacent ends apart, and thus bring the opposite ends bearing the type-bar journals closer together. I have shown the spring $d$ made detachable and having enlarged ends $d'$ to fit into corresponding cavities $d''$ in the two levers C C. This enables all of the parts to be separated from each other, so that the hanger may be repaired, if need be, or any of the parts renewed; but, if it be desired, the spring may be fixed to said arms. It is very important to have the journal-bearings of the type-bar steady, so that there will be no sagging from side to side, for if there be the type is very apt to get out of alignment.

In my improved bearing, the means of adjustment—viz., the screw $g$—can at any time be reached, as it is in a vertical position and beyond the other mechanism.

The action of tightening and loosening the journal-bearings is accomplished in every case above described by raising or lowering the screw.

What I claim as new, and desire to secure by Letters Patent, is—

1. In a type-writing machine, the combination of a type-bar, a hanger consisting of two pivoted levers having each at its rear end a vertically-arranged half-groove $f$, a vertically-arranged spreader adapted to engage with said grooves and open the rear ends of said arms, and a spring for closing the rear ends of said arms, substantially as set forth.

2. In a type-writing machine, the combination of a type-bar, a hanger composed of two spring-actuated levers, and a spreader for opening the rear ends of said levers against the tension of their spring, substantially as set forth.

3. In a type-writing machine, the combination of a type-bar, a hanger composed of two levers, a plate-spring arranged between said levers and connected thereto at each end, and a spreader for opening the rear ends of said levers against the tension of said spring, substantially as set forth.

4. An adjustable bearing for the type-bar journals of a type-writing machine, consisting of two lever-arms connected by a spring-fulcrum, each arm having at one end a journal-socket and at the other end a screw-threaded groove, in combination with a tapering screw for entering said grooves, all substantially as and for the purposes described.

5. In a type-writing machine, the combination of a type-bar, two levers, each having a cavity $d''$, a half-groove $o$ and a half-threaded groove $f$, a cross-piece constructed at each end to fit into the cavity $d''$, a retaining-bolt $j$, and a threaded spreader engaging the threaded grooves $ff$, substantially as set forth.

In testimony whereof I have signed my name to this specification, in the presence of two subscribing witnesses, on this 22d day of December, A. D. 1888.

JEAN D. MASON

Witnesses:
   JOHN D. CAMPBELL,
   ADAM WELKER.